(12) United States Patent
Baba et al.

(10) Patent No.: US 7,937,376 B2
(45) Date of Patent: May 3, 2011

(54) METHOD FOR CHANGING CONFIGURATION OF SERVERS IN A SHARED-NOTHING DATABASE SYSTEM

(75) Inventors: Tsunehiko Baba, Hachioji (JP); Norihiro Hara, Kawasaki (JP)

(73) Assignee: Hitachi, Ltd., Tokyo (JP)

( * ) Notice: Subject to any disclaimer, the term of this patent is extended or adjusted under 35 U.S.C. 154(b) by 560 days.

(21) Appl. No.: 11/504,076

(22) Filed: Aug. 15, 2006

(65) Prior Publication Data
US 2007/0288474 A1 Dec. 13, 2007

(30) Foreign Application Priority Data
Jun. 9, 2006 (JP) .................................. 2006-161192

(51) Int. Cl.
*G06F 7/00* (2006.01)
*G06F 17/00* (2006.01)
(52) U.S. Cl. ......... 707/703; 707/705; 709/223; 709/226
(58) Field of Classification Search .................. 707/205, 707/703, 705; 709/223, 226
See application file for complete search history.

(56) References Cited

U.S. PATENT DOCUMENTS
6,038,677 A * 3/2000 Lawlor et al. ................. 714/4
2005/0154731 A1 7/2005 Ito et al.

FOREIGN PATENT DOCUMENTS
JP 2005-196602 7/2005

OTHER PUBLICATIONS

"Dynamic Data Reallocation for Skew Management in Shared-Nothing Parallel Databases", by Helal et al., Distributed and Parallel Databases 5, 271-288 (1997).*
"The Simulation Evaluation of Heat Balancing Strategies for Btree Index over Parallel Shared Nothing Machines", by Feelifl et al., IEIC Technical Report, vol. 99; No. 343; pp. 7-12 (1999).*
"A Fast Convergence Technique for Online Heatbalancing of Btree Indexed Database over Shared-nothing Parallel Systems", by Feeliifl, Lecture Notes in Computer Science, Database and Expert Systems Applications, Publisher: Springer Berlin/Heidelberg, vol. 1873/2000, pp. 846-858, Jan. 1, 2000.*

(Continued)

*Primary Examiner* — Jay A Morrison
(74) *Attorney, Agent, or Firm* — Stites & Harbison PLLC; Juan Carlos A. Marquez, Esq.

(57) ABSTRACT

Provided is a method of changing the configuration of a shared-nothing database system without shutting down the system. The configuration changing method for a shared-nothing database system includes plural database servers, a storage which provides data areas to the database servers, and a management server which has a database management system and divides a transaction to allocate pieces of the transaction to the database servers, and the configuration changing method allows no two of the database servers to access the same data area. The configuration changing method changes the configurations of the database servers by specifying which data area is to be reallocated, judging whether or not the specified data area can be reallocated, and reallocating the specified data area without shutting down the database management system when it is judged that the specified data area can be reallocated.

17 Claims, 15 Drawing Sheets

OTHER PUBLICATIONS

"An extensible administration and configuration tool for Linux clusters", by John D. Fogarty, A dissertation submitted to the University of Dublin, 1999.*

"Parallel Query Processing in Shared Disk Database Systems", by Erhard Rahm, Proc. 5th Int. Workshop on High Performance Transaction Systems (HPTS-5), Asilomar, Sep. 1993.*

"Performance Evaluation of Parallel Transaction Processing in Shared Nothing Database Systems", by Robert Marek et al., Proc. PARLE-92 (Parallel Architectures and Languages Europe), Paris, 1992, Lecture Notes in Computer Science 605, Springer-Verlag, pp. 295-310.*

"The Simulation Evaluation of Heat Balancing Strategies for Btree Index over Parallel Shared Nothing Machines", by Hisham Feelifl, IEIC Technical Report (Institute of Electronics, Information and Communication Engineers), vol. 99; No. 343(DE99 81-89);p. 7-12(1999).*

U.S. Appl. No. 11/347,202, filed Feb. 6, 2006, Baba et al.

* cited by examiner

| TRANSACTION NUMBER 921 | DATA AREA 922 | | | | ELAPSED TIME 923 | ESTIMATED REMAINING TIME 924 |
|---|---|---|---|---|---|---|
| TRANSACTION 03 | #B | #E | | | 2:02 | 0:33 |
| TRANSACTION 04 | #C | #F | | | 0:40 | 1:49 |
| | | | | | | |

| DB SERVER 931 | DATA AREA 932 | | | |
|---|---|---|---|---|
| DB SERVER (1) | #A | #B | #C | |
| DB SERVER (2) | #D | #E | #F | |

| DATA AREA 941 | #A | #B | #C |
|---|---|---|---|

| | | |
|---|---|---|
| CONFIGURATION TYPE | ⦿ ADDITION OF DB SERVER | ○ REMOVAL OF DB SERVER | 901
| SUBJECT DB SERVER | DB SERVER (3) | | 902
| DATA AREA ALLOCATION METHOD | ⦿ EQUAL DATA AREA | ○ EQUAL ACCESS FREQUENCY | 903
| DBMS SHUTDOWN NECESSITY | ○ SHUT DOWN DBMS | ⦿ DO NOT SHUT DOWN DBMS | 904
| TO-BE-RELOCATED DATA AREA | ○ EVERY DATA AREA | ⦿ ONLY DATA AREA WHERE TRANSACTION HAS NOT BEEN EXECUTED | 905
| TRANSACTION INTERRUPTION/ CONTINUATION | ⦿ CONTINUED | ○ INTERRUPTED | 906
| TRANSACTION SELECTION METHOD | ⦿ LESS ELAPSED TIME | ○ MORE REMAINING EXECUTION TIME | 907

| | |
|---|---|
| CONFIGURATION CHANGE TYPE | ADDITION OF DB SERVER | ~911
| SUBJECT DB SERVER | DB SERVER (3) | ~912
| DATA AREA ALLOCATION METHOD | EQUAL DATA AREA | ~913
| DBMS SHUTDOWN NECESSITY | DO NOT SHUT DOWN DBMS | ~914
| TO-BE-RELOCATED DATA AREA | ONLY DATA AREA WHERE TRANSACTION HAS NOT BEEN EXECUTED | ~915
| TRANSACTION INTERRUPTION/CONTINUATION | CONTINUED | ~916
| TRANSACTION SELECTION METHOD | LESS ELAPSED TIME | ~917

| TRANSACTION NUMBER (961) | DATA AREA (962) | | | | ELAPSED TIME (963) | ESTIMATED REMAINING TIME (964) |
|---|---|---|---|---|---|---|
| TRANSACTION 03 | #B | #E | | | 2:02 | 0:33 |
| TRANSACTION 04 | #C | #F | | | 0:40 | 1:49 |
| TRANSACTION 05 | #A | #D | | | 0:20 | 1:05 |

*FIG. 10*

METHOD FOR CHANGING CONFIGURATION OF SERVERS IN A SHARED-NOTHING DATABASE SYSTEM

CLAIM OF PRIORITY

The present application claims priority from Japanese patent application 2006-161192 filed on Jun. 9, 2006, the content of which is hereby incorporated by reference into this application.

CROSS-REFERENCE TO RELATED APPLICATION

This application is related to U.S. application Ser. No. 11/347,202 filed on Feb. 6, 2006, the disclosure of which is hereby incorporated by reference.

BACKGROUND OF THE INVENTION

This invention relates to a computer system of a variable configuration constituting a shared-nothing database management system and, more specifically, a technique of changing the system configuration without shutting down a database completely.

Shared-nothing database management systems (hereinafter abbreviated as DBMS) have DB servers for processing transactions and data areas for storing processing results on a one-to-one basis logically or physically. Performance of a DBMS depends on a data processing amount of the DB server on each computer (node) when the performance is uniform throughout all nodes. For full DBMS performance, it is therefore desirable to make the data processing amount of the DB server equal at every node.

When the DB servers of the nodes are unevenly allocated to data areas to process, the data processing amount is balanced among the nodes by adding a node to the DBMS or removing one of the nodes from the DBMS.

The amount of data handled by the DBMS has increased as computer systems have become more complicated and larger in scale in recent years. The increase is dealt by enhancing the processing ability of the DBMS through employment of a cluster configuration. As a platform for building the cluster configuration system, a blade server which allows easy addition of a node has come into wide use.

With a blade server, however, it is difficult to set in advance the count of DB servers and data areas in a manner that avoids lowering of DBMS performance based on every conceivable configuration change since a blade server makes it easy to change the count of nodes constituting a cluster. Therefore, a configuration in which data areas are allocated evenly could be imbalanced in data area size among the nodes after the configuration change.

The problem of uneven data area size among nodes in the shared-nothing database management system that has a cluster configuration is addressed by JP 2005-196602 A, which discloses a technique of balancing the data processing amount by reallocation of data processing amount among DB servers.

In JP 2005-196602 A, the shared-nothing database management system divides the data area physically or logically into plural areas, which are allocated to respective DB servers. The sections of the data area allocated to the DB servers are reallocated as the total DB server count or the DB server count per node increases or decreases.

The technique described in JP 2005-196602 A is one to change the allocation of the entire data area to the DB servers, and accordingly requires to ensure that the DBMS is in a state in which no transaction is executed in order to ensure the data area consistency. Thus, with prior art, a configuration change has to wait for the completion of the service and shutdown of the database.

SUMMARY OF THE INVENTION

According to a representative aspect of this invention, there is provided a method of changing a configuration of a shared-nothing database system having plural database servers, which execute data processing, a storage which provides data areas to the database servers, and a management server which is connected to the database servers via a network, has a database management system, and divides a transaction to allocate pieces of the transaction to the database servers, no two of the database servers accessing the same data area, the database servers each having a first interface, which is connected to the network, a first processor which is connected to the first interface, and a first memory which is connected to the first processor, the management server having a second interface which is connected to the network, a second processor which is connected to the second interface, and a second memory which is connected to the second processor, the method including the steps of: specifying, by the second processor, which data area is to be reallocated in changing configurations of the database servers; judging, by the second processor, whether or not the specified data area can be reallocated; and reallocating, by the second processor, the specified data area without shutting down the database management system when it is judged that the specified data area can be reallocated.

According to the embodiment of this invention, the configuration of a computer system can be changed without shutting down a database.

BRIEF DESCRIPTION OF THE DRAWINGS

The present invention can be appreciated by the description which follows in conjunction with the following figures, wherein:

FIG. 2 is a diagram showing the configuration of a transaction-area association table that associates a transaction with a data area in which the transaction is executed according to the first embodiment;

FIG. 3 is a diagram showing the configuration of an area-DB server association table, which associates a data area with a DB server that exclusively uses the data area according to the first embodiment;

FIG. 4 is a diagram showing the configuration of an area management table for recording which data area is used exclusively by which DB server according to the first embodiment;

FIG. 6 is a diagram showing a GUI of a DB management console for instructing a configuration change according to the first embodiment;

FIG. 10 is a diagram showing the configuration of a transaction-area association table that associates a transaction with a data area in which the transaction is executed according to a second embodiment;

DETAILED DESCRIPTION OF THE PREFERRED EMBODIMENTS

Embodiments of this invention will be described below with reference to the accompanying drawings.

First Embodiment

Figure 1A:
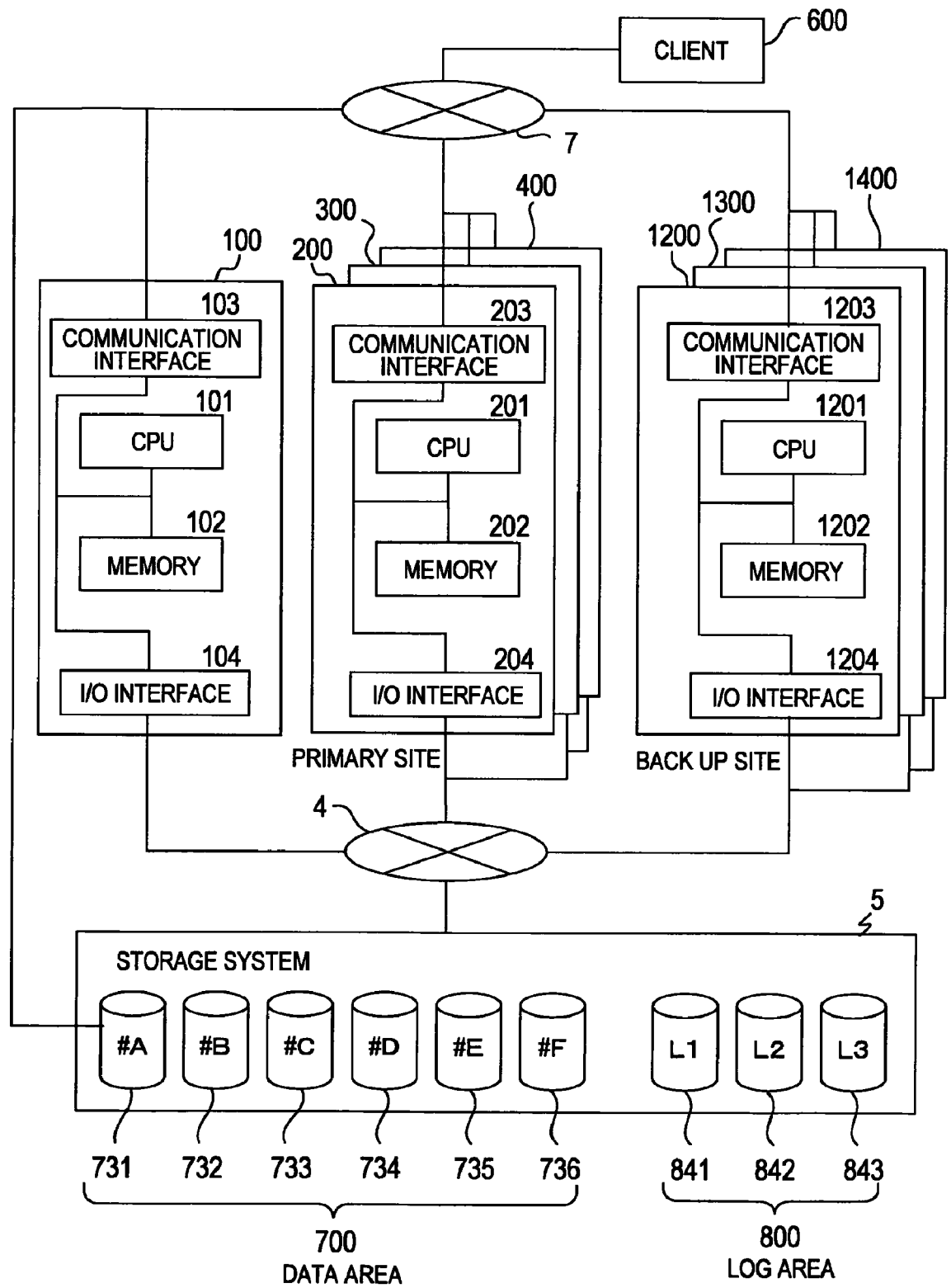
FIG. 1A is a block diagram showing a hardware configuration of a shared-nothing database management system according to a first embodiment.

FIG. 1A is a block diagram showing a hardware configuration of a database system according to a first embodiment.

The database system of the first embodiment has a cluster configuration in which a DB management node 100, an active group of computers 200 to 400, and a stand-by group of computers 1200 to 1400 are connected to one another via a network 7. The network 7 is, for example, an IP network.

The DB management node 100 executes a database management system and cluster management program for managing the database nodes (hereinafter referred to as "DB nodes") 200 to 400. The DB management node 100 has a CPU 101, a memory 102, a network interface 103 and an I/O interface 104.

The CPU 101 implements various types of processing by executing programs stored in the memory 102. The memory 102 stores programs executed by the CPU 101 and data necessary for processing.

The network interface 103 communicates with other computers via the network 7. The I/O interface 104 accesses a storage 5 through a storage network 4. The storage network 4 is a network that connects the computers to the storage 5, and can be a storage area network (SAN), an iSCSI, or the like.

The active computer group of the first embodiment includes plural DB nodes 200, 300 and 400 which provide a database service.

The DB node 200 has a CPU 201, a memory 202, a network interface 203 and an I/O interface (host bus adapter) 204.

The CPU 201 implements various types of processing by executing programs stored in the memory 202. The memory 202 stores programs executed by the CPU 201 and data necessary for processing.

The network interface 203 communicates with other computers via the network 7. The I/O interface 204 accesses the storage 5 through the storage network 4.

The DB nodes 300 and 400 have the same hardware configuration as the DB node 200.

A computer in the stand-by computer group takes over the service of one of the active DB nodes 200 to 400 when a failure occurs in the active DB node. The stand-by computer group is composed of the DB nodes 1200 to 1400 which correspond to the DB nodes 200 to 400 of the active computer group. The DB nodes 1200 to 1400 of the stand-by computer group all have the same configuration as the DB node 200 described above.

The storage 5 has plural disk drives. The storage 5 includes a data area 700 and a log area 800. The data area 700 and the log area 800 are accessible to the active DB nodes 200 to 400, the management node 100 and the stand-by nodes 1200 to 1400.

The data area 700 includes an area (volume) #A (731) to an area (volume) #F (736). The areas #A (731) to #F (736) included in the data area 700 store data utilized by a database of the DB nodes 200 to 400.

The log area 800 includes areas 841 to 843. The areas 841 to 843 store database logs of the DB nodes 200 to 400.

A client 600 is connected to the network 7. The client 600 utilizes the database through the DB management node 100.

Figure 1B:
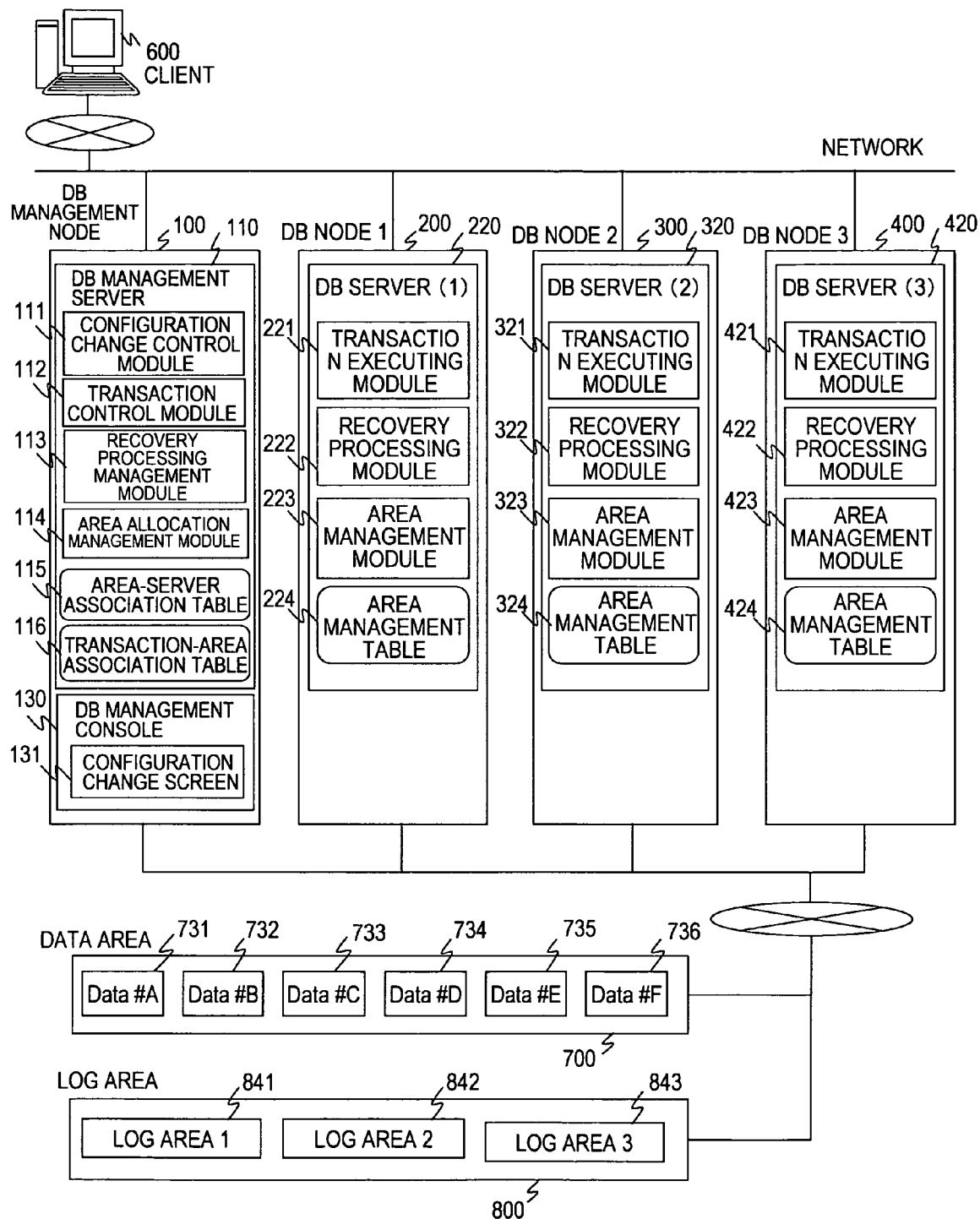
FIG. 1B is a software-oriented function block diagram of the shared-nothing database system according to the first embodiment.

FIG. 1B is a software-oriented function block diagram of the database system according to the first embodiment. The stand-by computer group is omitted from FIG. 1B since the active computer group and the stand-by computer group have the same configuration as mentioned above.

The DB management node 100 includes a DB management server 110. The DB node 200 includes a DB server 220. The DB node 300 includes a DB server 320. The DB node 400 includes a DB server 420. The DB servers 220, 320 and 420 are identified by identifiers "DB server (1)", "DB server (2)" and "DB server (3)", respectively.

The DB servers 220 to 420 are respectively allocated the areas #A (731) to #F (736) included in the data area 700. The DB servers 220 to 420 exclusively use their respective allocated areas to execute transactions, thus constituting a so-called shared-nothing database system. A transaction is a group of interdependent data operation requests. Accordingly, data to be operated in one transaction does not have a dependency relation with data to be operated in another transaction, and different transactions can be processed independently of each other.

The DB servers 220 to 420 are also allocated the areas 841 to 843 included in the log area 800.

The DB server 220 comprises a transaction executing module 221, a recovery processing module 222, an area management module 223 and an area management table 224. The transaction executing module 221, the recovery processing module 222 and the area management module 223 are programs, and carry out their functions when the programs are executed by the CPU 201.

The transaction executing module 221 executes a transaction in response to a processing request sent from the DB management server 110.

The recovery processing module 222 uses a database log to recover data in a manner that keeps data consistency which otherwise would be lost by interrupting a transaction.

The area management module 223 updates a data area that is used exclusively by the DB server 220. The area management table 224 holds the identifier of a data area that is used exclusively by the DB server 220.

The DB servers 320 and 420 have the same configuration as the DB server 220.

The DB management node 100 includes the DB management server 110 and a DB management console 130. The DB management server 110 comprises a configuration change control module 111, a transaction control module 112, a recovery processing management module 113, an area allocation management module 114, an area-server association table 115 and a transaction-area association table 116.

The configuration change control module 111 receives a configuration change instruction, which is entered by an administrator through the DB management console 130, and changes the association between the DB servers 220 to 420 and the data areas 731 to 736. The term configuration change refers particularly to changing the association between a DB server and a data area. "Data area allocation" means associating a data area with a DB server. "Data area relocation" refers to a change in which a data area that has been used exclusively by one DB server is reallocated exclusively to another DB server.

The transaction control module 112 divides a transaction that is instructed by the client 600 to execute into sub-transactions. The sub-transactions are executed separately in the respective data areas. After the execution of the sub-transactions is completed in all the data areas, the transaction control module 112 sends results of the execution to the client 600.

The recovery processing management module 113 instructs the DB servers 220 to 420 to return the database to a state prior to execution of a transaction through recovery processing when there is a risk of data inconsistency caused by the interruption of the transaction.

The area allocation management module 114 associates the DB servers 220 to 420 with data areas that are used exclusively by the DB servers 220 to 420.

The area-server association table 115 records the association between the DB servers 220 to 420 and data areas that are used exclusively by the DB servers 220 to 420.

The transaction-area association table 116 is a record of which sub-transaction is executed in which data area.

The DB management console 130 displays a configuration change instruction input screen 131 for entering a configuration change instruction, and accepts a configuration change instruction given by the administrator.

The data area 700 is composed of plural areas #A (731) to #F (736). The data areas #A (731) to #F (736) are allocated to the DB servers 220 to 420.

The log area 800 includes logs 841 to 843 of the respective DB servers. The logs 841 to 843 hold information on transactions executed by the respective DB servers in the data areas and information on changes brought by executing the transactions along with information on whether the changes are committed or not.

FIG. 2 is a configuration diagram of the transaction-area association table 116 stored in the DB management server 110 according to the first embodiment.

The transaction-area association table 116 includes a transaction number 921, a data area 922, an elapsed time 923 and an estimated remaining time (till completion of execution) 924. A record of the transaction-area association table 116 is recorded only while a transaction is being executed. In other words, a record is recorded as execution of a transaction is started and the record is deleted upon completion of the execution.

Stored as the transaction number 921 is an identifier unique to a transaction requested by the client 600 to be processed by the DBMS. Stored as the data area 922 are data areas in which sub-transactions obtained by dividing the requested transaction are executed. The time elapsed from the start of the transaction is stored as the elapsed time 923. An estimated time till the execution of the transaction is completed is stored as the estimated remaining time 924. How to calculate the estimated time will be described later with reference to FIG. 14.

The elapsed time 923 and the estimated remaining time 924 are not used in the first embodiment.

FIG. 3 is a configuration diagram of the area-server association table 115 stored in the DB management server 110 according to the first embodiment.

The area-server association table 115 includes a DB server field 931 and a data area field 932.

The DB server field 931 holds an identifier unique to each DB server.

The data area field 932 holds identifiers assigned to areas in the data area 700 that are associated with a specified DB server.

FIG. 4 is a configuration diagram of the area management table 224 stored in the DB server 220 according to the first embodiment. The DB servers 320 and 420 respectively includes area management tables 324 and 424, which have the same configuration as the area management table 224.

The area management table 224 holds identifiers assigned to areas in the data area 700 that are used exclusively by the DB server 220.

Figure 5:
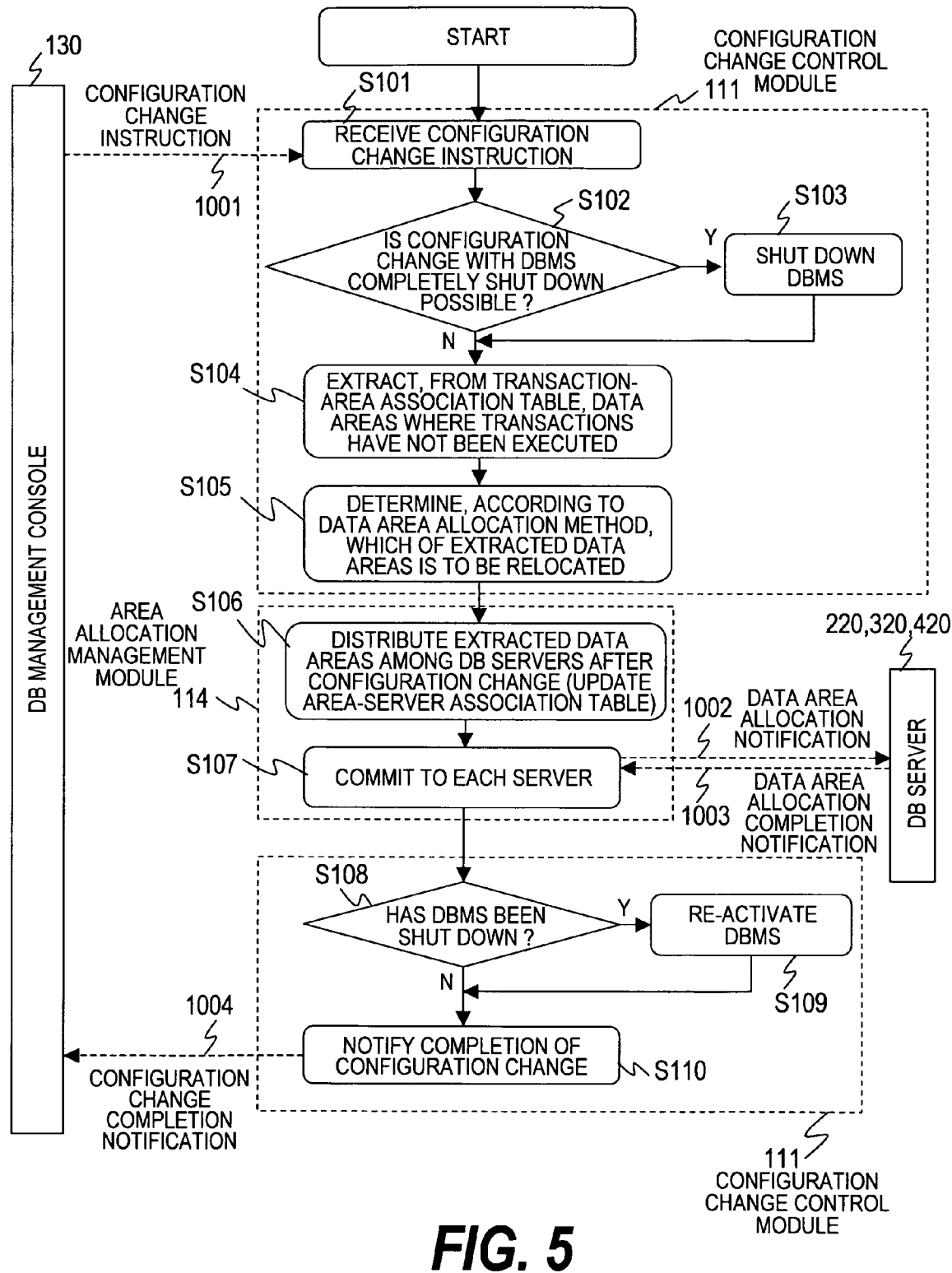
FIG. 5 is a flow chart showing the procedure of executing a system configuration change by allocating data areas in which transactions have not been executed according to the first embodiment.

FIG. 5 is a flow chart showing the procedure of changing the configuration of the database system according to the first embodiment. FIG. 5 illustrates how the configuration of the database system is changed according to a configuration change instruction that is described later with reference to FIG. 7. The area-server association table 115 and the transaction-area association table 116 here are as shown in FIGS. 3 and 2, respectively.

First, the administrator enters a configuration change instruction through the DB management console 130. The DB management console 130 displays the configuration change instruction input screen 131 through a GUI shown in FIG. 6 in order to change the configuration of the database system. The administrator enters necessary information in the configuration change instruction input screen 131 to send a configuration change instruction 1001 to the DB management server 110.

Now, a description will be given with reference to FIG. 6 on the configuration change instruction input screen 131 displayed on the DB management console 130.

Items of the configuration change instruction that can be specified are a configuration change type 901, a subject DB server 902, a data area allocation method 903, a DBMS shutdown necessity 904, a to-be-relocated data area 905, transaction interruption/continuation 906, and an interrupted transaction selection method 907. These setting items are merely an example, and items can be added or removed to suit the mode of the system.

In the field of the configuration change type 901, the type of the configuration change is specified. For example, an addition or removal of a DB server is specified.

In the field of the subject DB server 902, the identifier of the DB server to be added or removed is entered. The identifier "DB server (3)" of the newly added DB server is entered in this example.

How to allocate data areas that are relocated to change the configuration is specified in the field of the data area allocation method 903. An example of how to allocate data areas is a method in which data areas are allocated in a manner that equalizes the capacity of data areas used exclusively by the respective DB servers. Another example is a data area allocation method in which data areas allocated according to the data access frequency indicative of the load of the DB server. Still another example is a method of allocating data areas according to the processing ability of the DB node where the DB server operates. When employing these allocation methods, a table showing the data access frequencies of data areas or a table showing the processing abilities of DB nodes may be added to the configuration change instruction input screen 131 as needed.

Whether to shut down the operating DBMS upon execution of the configuration change is specified in the field of the DBMS shutdown necessity 904.

The field of the to-be-relocated data area 905 is used to designate which data area is to be relocated through the configuration change. For example, a choice can be made between relocating all data areas and relocating only data areas in which no transactions are being executed.

The field of the transaction interruption/continuation 906 is used to specify whether the configuration change is carried out after interrupting a transaction that is being executed in a data area to be relocated or without interrupting the transaction.

The field of the interrupted transaction selection method 907 is used to specify a method of selecting which transaction is interrupted first when there are plural transactions to be interrupted. For example, a choice can be made between selecting, out of transactions that are being executed, one with less elapsed time since the start of the execution and selecting a transaction of which the estimated remaining time till completion of execution is long.

The configuration change instruction input screen 131 shown in FIG. 6 is a representative example of the display screen of the DB management console, and is not to limit, for example, items included in a configuration change instruction. Instead of GUI, CUI (Character-based User Interface) may be employed when it enables the administrator to give a similar configuration instruction change.

Figures 7, 8:
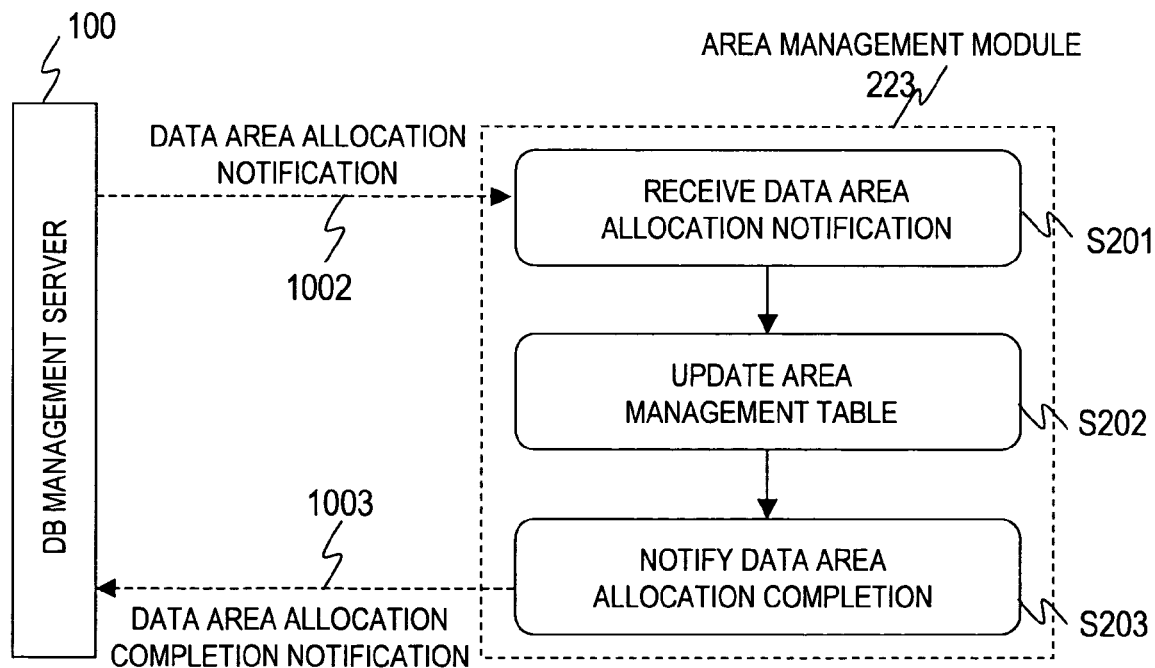
FIG. 7 is a diagram showing a configuration change instruction which is given through the GUI of the DB management console according to the first embodiment.
FIG. 8 is a flow chart showing processing of changing which data area is used exclusively by which DB server according to the first embodiment.

FIG. 7 is a diagram showing the contents of the configuration change instruction that is specified through the DB management console 130 according to the first embodiment.

The DB management console 130 sends a configuration change instruction specified in the configuration change instruction input screen 131 to the DB management server 110 as a notification 1001 of FIG. 5.

Items 911 to 917 correspond respectively to 901 to 907 of the GUI of FIG. 6.

A reference is made to FIG. 7. The configuration change executed in the first embodiment is an addition of the DB server (3) without shutting down the DBMS. Data areas in which no transactions are being executed are relocated such that an equal data area capacity is allocated to each DB server.

Since it is data areas in which no transactions are being executed that are relocated, the transaction interruption/continuation 916 and the interrupted transaction selection method 917 are ignored in this example.

The description now returns to the flow chart of FIG. 5.

The configuration change control module 111 of the DB management server 110 receives the configuration change instruction 1001 sent from the DB management console 130 (S101).

The configuration change control module 111 refers to the DBMS shutdown necessity 914 of the configuration change instruction 1001 to judge whether to allow shutdown of the DBMS upon the configuration change (S102).

In the case where shutdown of the DBMS upon the configuration change is permitted (answer to S102 is "Y"), the DBMS is shut down (S103). As a result, all transactions that are being executed in the DB servers are interrupted.

In the case where shutdown of the DBMS upon the configuration change is not permitted (answer to S102 is "N" in S102), the processing moves to S104.

In S104, the configuration change control module 111 refers to the area-server association table 115 and the transaction-area association table 116 to extract data areas where no transactions are being executed.

To detail the processing of S104, the configuration change control module 111 first extracts every data area that can be a subject of the configuration change. The configuration change control module 111 reads data areas stored as the data area 932 of the area-server association table 115 and extracts every data area. The data areas #A to #F are extracted as shown in FIG. 3.

The configuration change control module 111 next extracts data areas in which no transactions are being executed. To this end, the configuration change control module 111 refers to the transaction-area association table 116 and extracts the transaction 921 that is being executed and the data area 922 in which the transaction 921 is being executed. The data area 922 in which the transaction 921 is being executed is checked against all the extracted data areas, and is subtracted from all the data areas. As a result, the remaining data areas are data areas where no transactions are being executed.

With reference to FIG. 2, a transaction 03 is being executed in the data areas #B and #E, and a transaction 04 is being executed in the data areas #C and #F. The data areas #B, #C, #E and #F are subtracted from all the extracted data areas #A to #F, which leaves the data areas #A and #D. Thus, the data areas #A and #D are extracted as data areas in which no transactions are being executed.

The configuration change control module 111 determines, according to the configuration change instruction, which of the data areas extracted in the processing of S104 is to be relocated (S105). For instance, based on the configuration change type 911, the configuration change subject DB server 912 and the data area allocation method 913, a data area that fulfills the specified conditions most is determined as a data area to be relocated.

To detail the processing of S105, the configuration change control module 111 first refers to the data area allocation method 913 of the received configuration change instruction to obtain a specified data area allocation method. With reference to FIG. 7, in the first embodiment, "equal data area" is specified as a data area allocation method.

The configuration change control module 111 next obtains the total DB server count after the configuration change. The configuration change control module 111 obtains the total DB server count prior to the configuration change from how many records are held in the area-server association table 115. Then the DB server count prior to the configuration change increases or decreases according to the contents of the configuration change type 911 of the configuration change instruction.

With reference to FIG. 7, "addition of a DB server" is specified as the configuration change type 911. The DB server (3) is added after the configuration change to the DB servers (1) and (2) which have been present since before the configuration change, and it makes the total DB server count three.

The configuration change control module 111 then obtains, from the data 932 in the area-server association table 115, the total count of data areas allocated to the DB servers. With reference to FIG. 3, the total data area count is six (data areas #A to #F).

The configuration change control module 111 also calculates the allocated data area count per DB server since "equal data area" is specified as the data area allocation method 913. With the total data area count being six and the total DB server count after the configuration change being three as mentioned above, two data areas allocated per DB server if each data area has the same capacity.

In the case where the total DB server count after the configuration change is not an aliquot part of the total data area count, the data areas are allocated as evenly as possible. For instance, as many data areas as the quotient+1 are allocated to the odd DB server whereas the rest of the DB servers are allocated as many data areas as the quotient.

The configuration change control module 111 next extracts candidates of data area to be relocated. In the first embodiment, out of combinations of the data areas #A and #D extracted in the processing of S104, three patterns, the data area #A alone, #D alone, and both #A and #D, can be obtained.

The configuration change control module 111 chooses one of the extracted candidates of to-be-relocated data area that most satisfies the data area allocation method 913 specified in the configuration change instruction 1001. The data area count that makes the count of exclusively used data areas uniform among the DB servers is two as mentioned above. Accordingly, allocating both the data areas #A and #D to the newly added DB server (3) makes the data area capacity allocated to each DB server equal.

In the case where any one of extracted candidates of to-be-relocated data area satisfies the condition, which data area is to be relocated may be determined by the ascending or descending order of data area identifier.

Whether a data area is to be relocated or not is judged by thus checking the to-be-relocated data areas extracted in the processing of S105 against the data areas extracted in the processing of S104 as areas that can be relocated.

The first embodiment shows an example of automatically determining which data area is extracted. Alternatively, the administrator may specify through the DB management console 130 a data area to be relocated. This makes it possible to judge whether or not the data area to be relocated is included in data areas extracted in the processing of S104.

As the processing of S105 is completed and data areas to be relocated are determined, the area allocation management module 114 allocates the to-be-relocated data areas to the DB servers after the configuration change (S106).

To be specific, a record for the "DB server (3)" is first added to the area-server association table 115 since the configuration change type 911 of the configuration change instruction is "addition of a DB server". #A and #D are recorded as the data area 932 of the added record. Then records for the DB server (1) and the DB server (2) which have exclusively used the to-be-relocated data areas #A and #D are updated, and #A and #D are deleted from the field of the data area 932.

The area allocation management module 114 next commits the data area allocation change to the DB servers (S107). To be specific, the area allocation management module 114 sends a data area allocation notification 1002 to each DB server. The DB servers respectively send a data area allocation completion notification 1003 to the area allocation management module 114 after the data area allocation is completed.

A description will be given on what processing is executed in the DB servers upon reception of the data area allocation notification 1002.

FIG. 8 is a flow chart showing processing of allocating a specified data area to a DB server that is in operation at another node. The description here takes as an example processing executed in the DB server 220.

First, the area management module 223 receives the data area allocation notification 1002 from the DB management server 110 (S201).

The area management module 223 next updates the area management table 224 (S202). The data areas #A, #B and #C are registered in the area management table 224 shown in FIG. 4. To make such a change that the data area #A that has been used exclusively by the DB server 220 is allocated exclusively to the newly added DB server 420, the data area #A is deleted from the area management table 224. In the DB server 420, on the other hand, the data area #A is added to the area management table 424.

After the update of the area management table 224 is completed, the area management module 223 sends the data area allocation completion notification to the DB management server 110 (S203).

The description now returns to the flow chart of FIG. 5.

The configuration change control module 111 receives the data area allocation completion notification 1003 and judges whether or not the DBMS has been shut down (S108). In the case where the DBMS is shut down in the processing of S103 ("Y" in S108), the DBMS needs to be activated and the configuration change control module 111 activates the DBMS (S109).

When the activation of the DBMS is finished, or in the case where the DBMS has not been shut down ("N" in S108), the configuration change control module 111 sends a configuration change completion notification 1004 to the DB management console 130 (S110).

Through the above-described processing, the DB management server 110 can change the configuration without shutting down the DBMS.

Now a description will be given on the procedure of updating the transaction-area association table 116 as a transaction is executed in response to a transaction execution request made by the client 600 to the DB management server 110.

Figure 9:
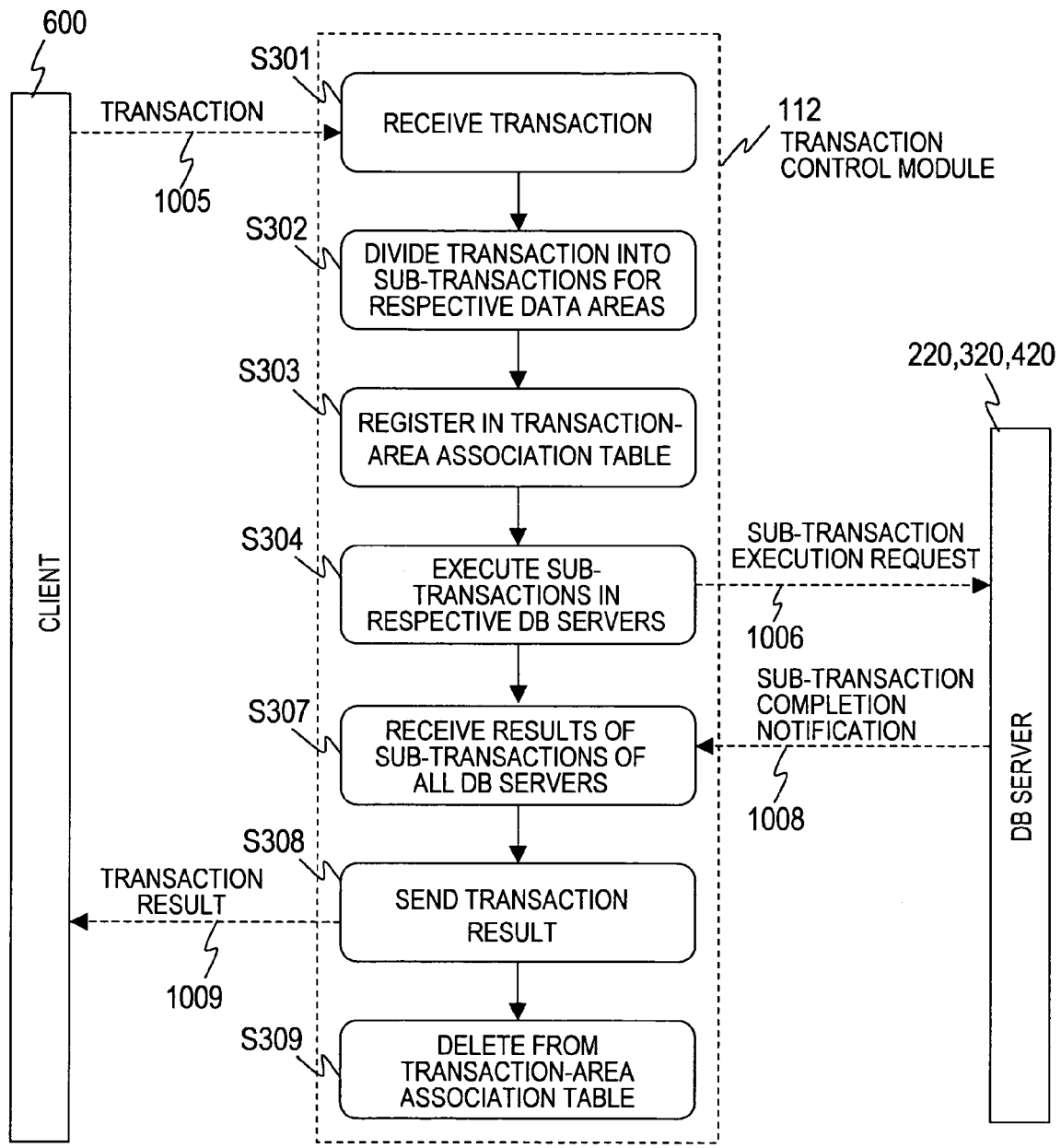
FIG. 9 is a flow chart showing processing of making the respective DB servers execute transactions which are received by a DB management server according to the first embodiment.

FIG. 9 is a flow chart showing a procedure employed by the DB management server 110 in receiving and executing a transaction that is sent from the client 600.

The transaction control module 112 first receives a transaction 1005 from the client 600 (S301).

The transaction control module 112 divides the received transaction 1005 into sub-transactions which can be executed separately in the respective data areas (S302).

The transaction control module 112 registers the sub-transactions in association with their original transaction 1005 in the transaction-area association table 116 (S303).

The transaction control module 112 refers to the area-server association table 115 to identify which DB server executes which sub-transaction, and sends a sub-transaction execution request 1006 in order to make the identified DB server execute the sub-transaction (S304).

The DB server sends a completion notification 1008 to the transaction control module 112 after completing the execution of the sub-transaction (S307).

When every sub-transaction is completed, the transaction control module 112 sends a transaction execution result 1009 to the client 600 (S308).

Thereafter, the transaction control module 112 deletes the entry of the transaction 1005 from the transaction-area association table 116 (S309).

The DB management server 110 thus divides a transaction requested to be processed into sub-transactions, and refers to the area-server association table 115 to make the DB servers execute the respective sub-transactions. The transaction is registered in association with data areas in which the sub-transactions are executed in the transaction-area association table 116, and this enables the DB management server 110 to recognize a data area in which a transaction is being executed.

According to the first embodiment, the configuration of a shared-nothing database system can be changed while the DBMS is in operation by relocating only data areas in which no transactions are being executed. In the case where the DBMS needs to be shut down, it is also possible to selectively execute a configuration change involving shut down and re-activation of the DBMS.

The first embodiment describes a configuration change in which a DB server is added and data areas are allocated evenly to every DB server, but is also applicable to a configuration change in which a DB server is removed. For instance, data areas allocated to a to-be-removed DB server are chosen as data areas to be relocated. In the case where the to-be-removed DB server is executing a transaction, a configuration change in which every data area allocated to the to-be-removed DB server is relocated is accomplished by repeatedly executing the first embodiment until the transaction is completed.

Second Embodiment

Data areas to be relocated in the first embodiment are data areas in which no transactions are being executed. In a second embodiment, all data areas are to be relocated.

"Every data area" is specified as the subject data area 915 in a configuration change instruction according to the second embodiment, instead of "only data areas where transactions are not being executed" in the configuration change instruction of the first embodiment shown in FIG. 7. The rest of the items are the same as in the first embodiment.

FIG. 10 is a diagram showing the transaction-area association table 116 according to the second embodiment. The transaction-area association table 116 of the second embodiment has the same configuration as the transaction-area association table 116 of the first embodiment shown in FIG. 2.

In the second embodiment, selecting and relocating data areas in which no transactions are executed is not possible since transactions are being executed in the data areas #A to #F as shown in FIG. 10. Accordingly, a data area to be relocated is not relocated until a transaction in the data area is completed.

Figure 11:
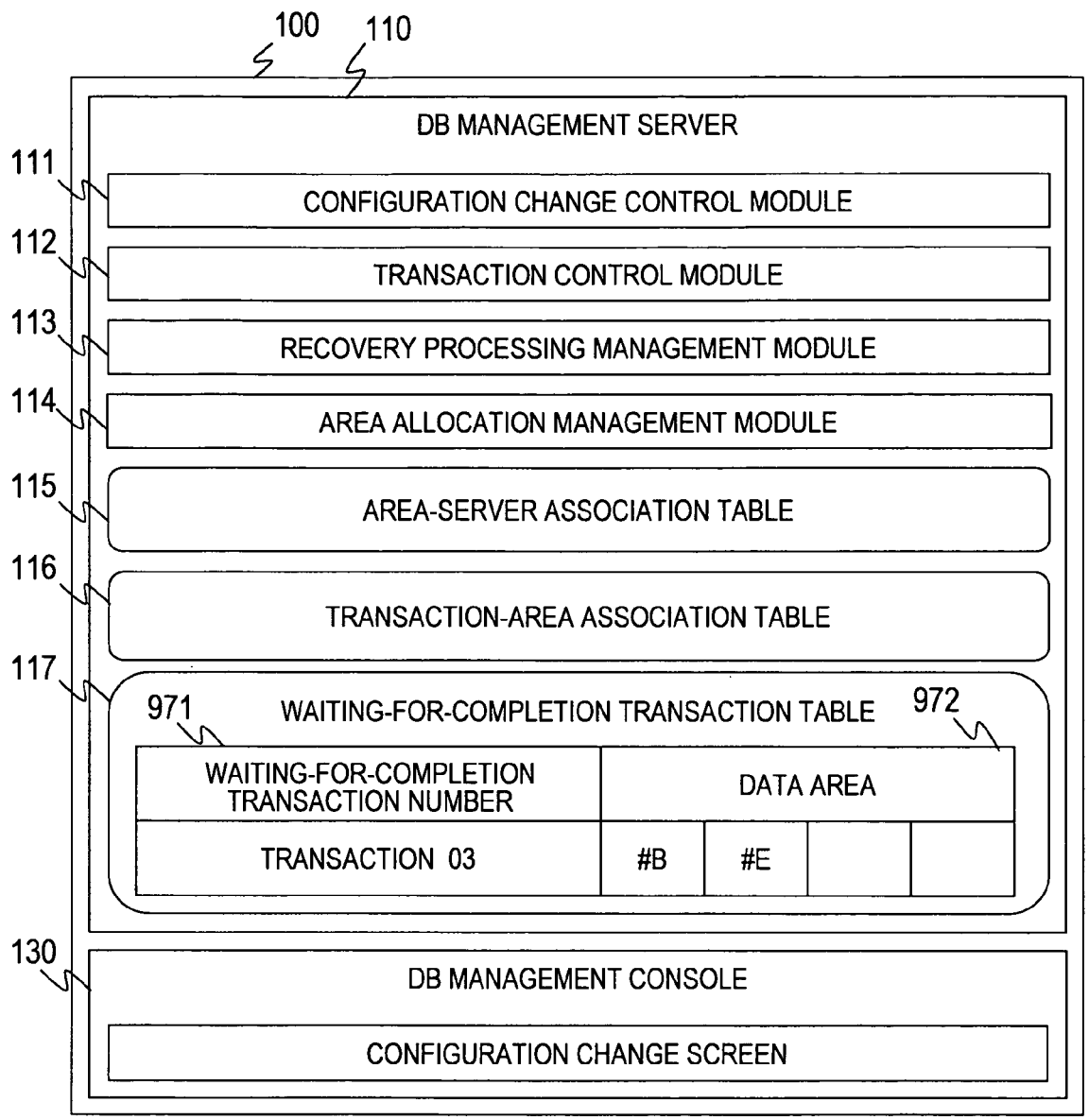
FIG. 11 is a block diagram of a DB management server according to the second embodiment.

FIG. 11 is a configuration diagram showing the DB management node 100 according to the second embodiment. The DB management node 100 of the second embodiment has, in addition to the components of the DB management node 100 of the first embodiment, a waiting-for-completion transaction table 117, which is used to manage transactions completion of which is waited for. The waiting-for-completion transaction table 117 includes a waiting-for-completion transaction number 971 and a data area 972 in which a transaction completion of which is waited for is being executed.

In the waiting-for-completion transaction table 117 of FIG. 11, "transaction 03" is registered as a transaction completion of which is waited for. Data areas in which the transaction 03 is executed are #B and #E.

The rest of the components of the DB management node 100 including the area-server association table 115 are the same as in the first embodiment.

Figure 12:
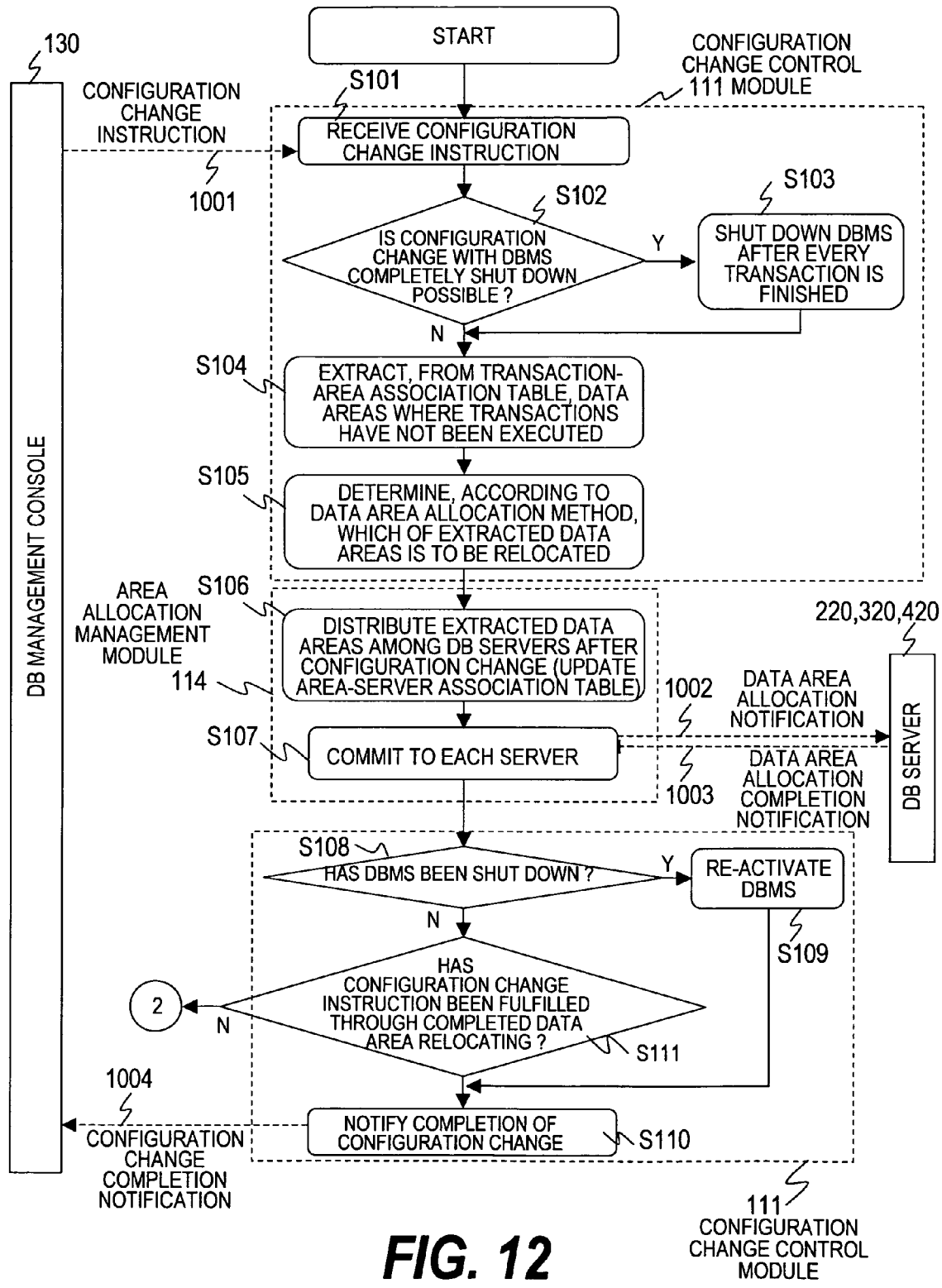
FIG. 12 is a flow chart showing the procedure of executing a configuration change by allocating data areas in which transactions have not been executed according to the second embodiment.
Figure 13:
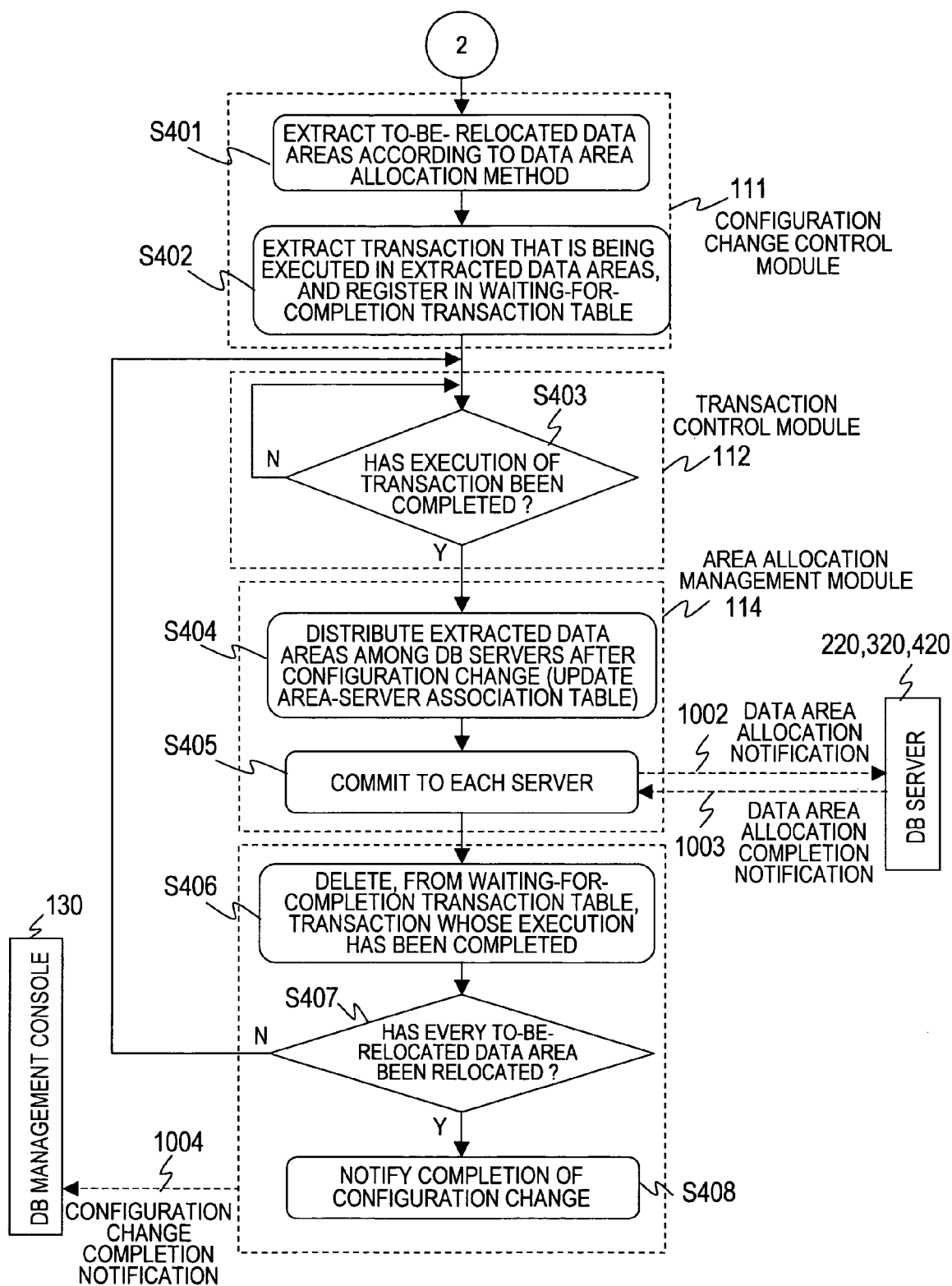
FIG. 13 is a flow chart showing the procedure of executing a configuration change after a transaction being executed is finished according to the second embodiment.
Figure 14:
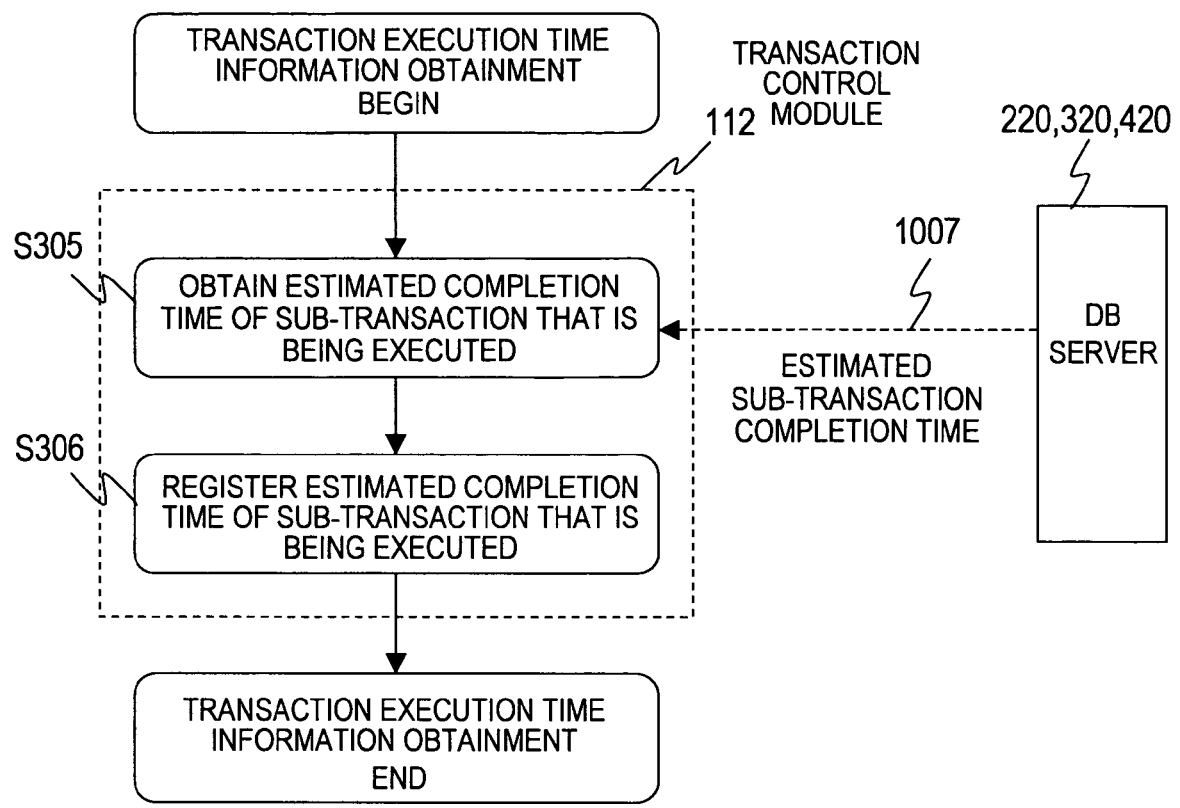
FIG. 14 is a flow chart showing the procedure of obtaining transaction execution time information and registering the execution time information in the transaction-area association table according to the second embodiment.

Described next is processing in the second embodiment. FIGS. 12 to 14 are flow charts showing the procedure of configuration change processing according to the second embodiment.

FIG. 12 is a flow chart showing the procedure of changing the configuration of a database system according to the second embodiment. The flow chart of FIG. 12 is basically the same as the flow chart of FIG. 5 according to the first embodiment. The difference between FIG. 12 and FIG. 5 is that, when it is found in processing of S1 that relocating only data areas where no transactions are being executed is not enough to fulfill a configuration change instruction, data areas where transactions are being executed are also relocated.

Relocating only data areas where no transactions are being executed is enough to fulfill a configuration change instruction when the transaction-area association table 116 is as shown in FIG. 4 as in the first embodiment.

On the other hand, when the transaction-area association table 116 is as shown in FIG. 10 where a transaction is executed in every data area as in the second embodiment, the processing procedure of the first embodiment (S104 to S107) cannot change the configuration in a manner that fulfills the configuration change instruction 1001 since no data area is available to be relocated.

In the second embodiment, whether or not the configuration change instruction 1001 has been fulfilled is judged in processing of S111 (S111) and, when the instruction has not been fulfilled ("N" in S111), processing shown in FIG. 13 is executed.

FIG. 13 is a flow chart showing the procedure of relocating a data area after a transaction that is being executed in the data area is completed according to the second embodiment.

The configuration change control module 111 extracts data areas to be relocated from the area-server association table 115 according to the data area allocation method 915 of the configuration change instruction 1001 (S401). When the transaction-area association table 116 is as shown in FIG. 10, the configuration change control module 111 extracts, as to-be-relocated data areas, the data areas #A to #C of the DB server (1) and the data areas #D to #F of the DB server (2). All the data areas are chosen as to-be-relocated data areas since "every data area" is specified as the subject data area 915.

The configuration change control module 111 next refers to the transaction-area association table 116 to extract transactions that are being executed in the extracted data areas. The configuration change control module 111 further registers the extracted transactions and the to-be-relocated data areas in which transactions are being executed in the waiting-for-completion transaction table 117 (S402).

In the transaction-area association table 116, the transactions 03, 04 and 05 are being executed. The configuration change control module 111 chooses the transaction 03 whose estimated remaining time 964 is the shortest since the shorter the waiting time until completion of transaction, the better. The configuration change control module 111 records the thus chosen transaction 03 and the data areas #B and #E in which the transaction 03 is being executed in the waiting-for-completion transaction table 117.

After the processing of S402 is completed, the transaction control module 112 judges whether or not the transaction registered in the waiting-for-completion transaction table 117 has been finished (S403). In the case where the transaction has not been finished ("N" in S403), the processing of S403 is repeated until the transaction is finished.

As the execution of the registered transaction is completed ("Y" in S403), the area allocation management module 114 relocates the data areas recorded in the waiting-for-completion transaction table 117 (S404, S405). The processing of S404 and S405 are the same as the processing of S106 and S107 of FIG. 5 according to the first embodiment.

After that, the configuration change control module 111 deletes completed transactions from the waiting-for-completion transaction table 117 (S406).

The configuration change control module 111 then judges whether or not every data area has been relocated by judging whether or not the waiting-for-completion transaction table 117 has any remaining record (S407).

In the case where not all of the data areas have finished being relocated ("N" in S407), the configuration change control module 111 returns the processing back to S403, where the transaction control module 112 stands by until the remaining transactions that are still being executed are completed.

In the case where all of the to-be-relocated data areas have finished being relocated ("Y" in S407), the configuration change control module 111 sends the configuration change completion notification 1004 to the DB management console 130 (S408). The processing of S408 is the same as the processing of S109 of FIG. 5 according to the first embodiment.

How to estimate the remaining time till completion of execution of a transaction will now be described.

FIG. 14 is a flow chart of an execution time information obtaining subroutine for obtaining an estimated completion time of a sub-transaction. The execution time information obtaining subroutine is started when the transaction control module 112 sends the sub-transaction execution request 1006 to the DB servers 220, 320 and 420 in the flow chart shown in FIG. 9. The execution time information obtaining subroutine is kept executed until every sub-transaction is completed.

The transaction control module 112 makes the DB servers 220, 320 and 420 execute sub-transactions (S304 of FIG. 9) and concurrently receives a notification 1007, which includes an estimated completion time of a sub-transaction (S305). The notification 1007 includes an elapsed execution time in addition to the estimated completion time.

The transaction control module 112 calculates the elapsed execution time and estimated completion time of a transaction from the received notification 1007 and from the association relation between the transaction and sub-transactions. The calculation results are recorded as an elapsed time 963 and the estimated remaining time 964 in the transaction-area association table 116 (S306).

Thus executing the execution time information obtaining subroutine enables the DB management server 110 to obtain the estimated remaining time of a transaction.

According to the second embodiment, the configuration can be changed by relocating data areas where no transactions are being executed while the DBMS is in operation as in the first embodiment. It is also possible to change the configuration of the DBMS by relocating data areas after transactions being executed in the data areas are completed. Thus, the second embodiment makes it possible to change the configuration without interrupting transactions and without shutting down the database.

The second embodiment describes a case of adding a DB server, but is also applicable to a removal of a DB server as in the first embodiment.

Third Embodiment

In a third embodiment, the configuration is changed after interrupting a transaction that is being executed. "Every data area" is specified as the subject data area 915 and "interrupted" is specified as the transaction interruption/continuation 916 in a configuration change instruction according to the third embodiment, instead of "only data areas where transactions are not being executed" and "continued" in the configuration change instruction of the first embodiment shown in FIG. 7. Also, "less elapsed time" is specified as the transaction selection method 917 in the third embodiment. The rest of the items are the same as in the first embodiment.

The transaction-area association table 116 is as shown in FIG. 10. The area-server association table 115 is as shown in FIG. 3.

In the third embodiment, the procedure shown in the flow chart of FIG. 12 according to the second embodiment is executed first. When it is found in the processing of S111 that relocating only data areas where no transactions are being executed is not enough to fulfill a configuration change instruction, the configuration change control module 111 moves to a flow chart of FIG. 15.

Figure 15:
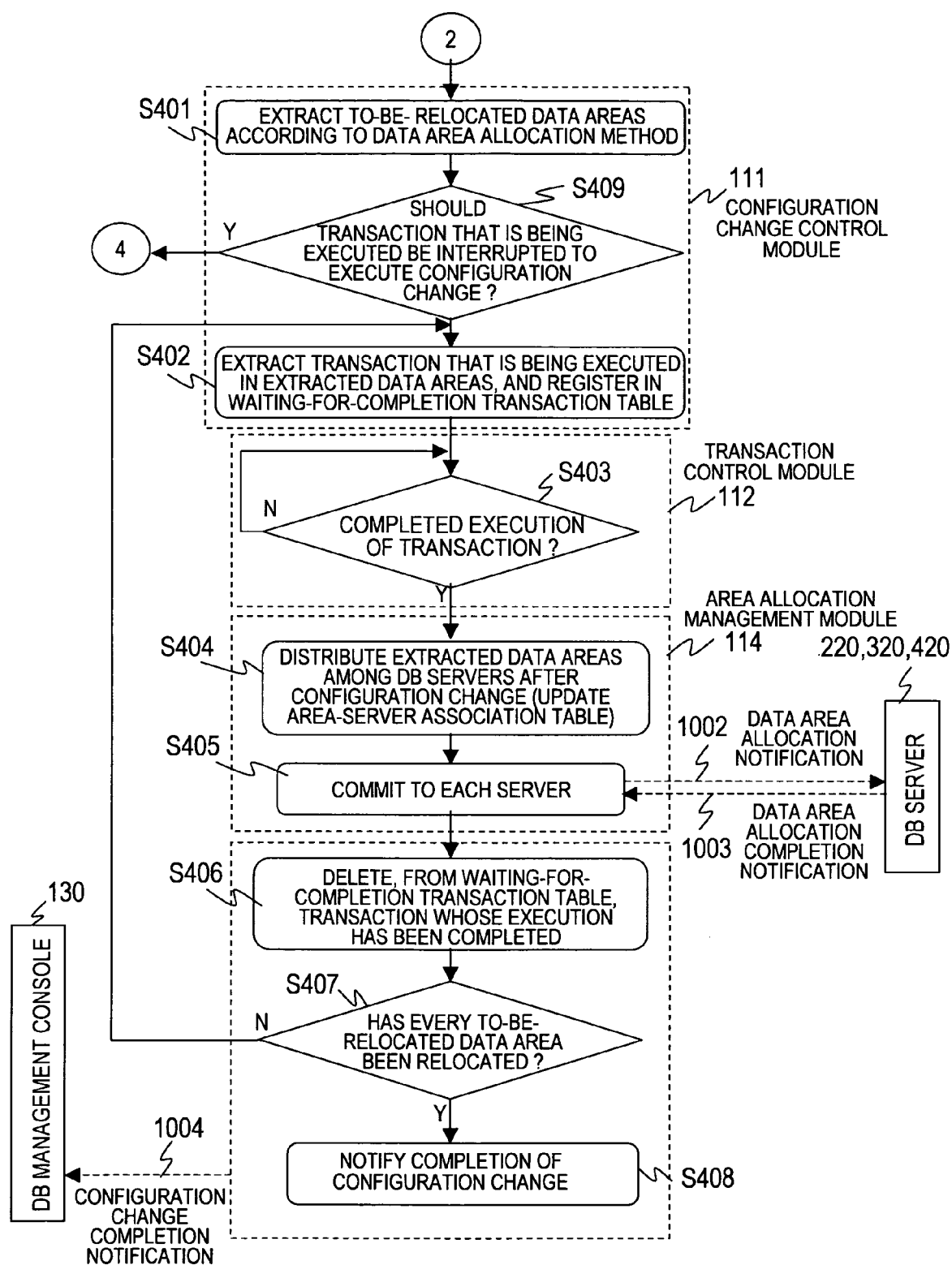
FIG. 15 is a flow chart showing the procedure of executing a configuration change after a transaction being executed is finished according to a third embodiment.

FIG. 15 is a flow chart showing the procedure of changing the configuration of a database system according to the third embodiment. The procedure in the flow chart of FIG. 15 is basically the same as in the flow chart of FIG. 13 according to the second embodiment. To be specific, the processing of S401 to S408 of FIG. 15 is the same as the processing of S401 to S408 of FIG. 13. The difference between FIG. 15 and FIG. 13 is that the third embodiment has additional processing of S409 placed after the processing of S401.

After the processing of S401 is finished, the configuration change control module 111 executes the processing of S409. The configuration change control module 111 judges from the transaction interruption/continuation 916 of the configuration change instruction 1001 whether or not a transaction is allowed to be interrupted (S409). In the case where interruption of the transaction is not permitted ("N" in S409), the configuration change control module 111 executes the processing of S402. In this case, the processing is the same as in the second embodiment. In the case where interruption of the transaction is permitted ("Y" in S409), the configuration change control module 111 executes a flow chart of FIG. 16.

Figure 16:
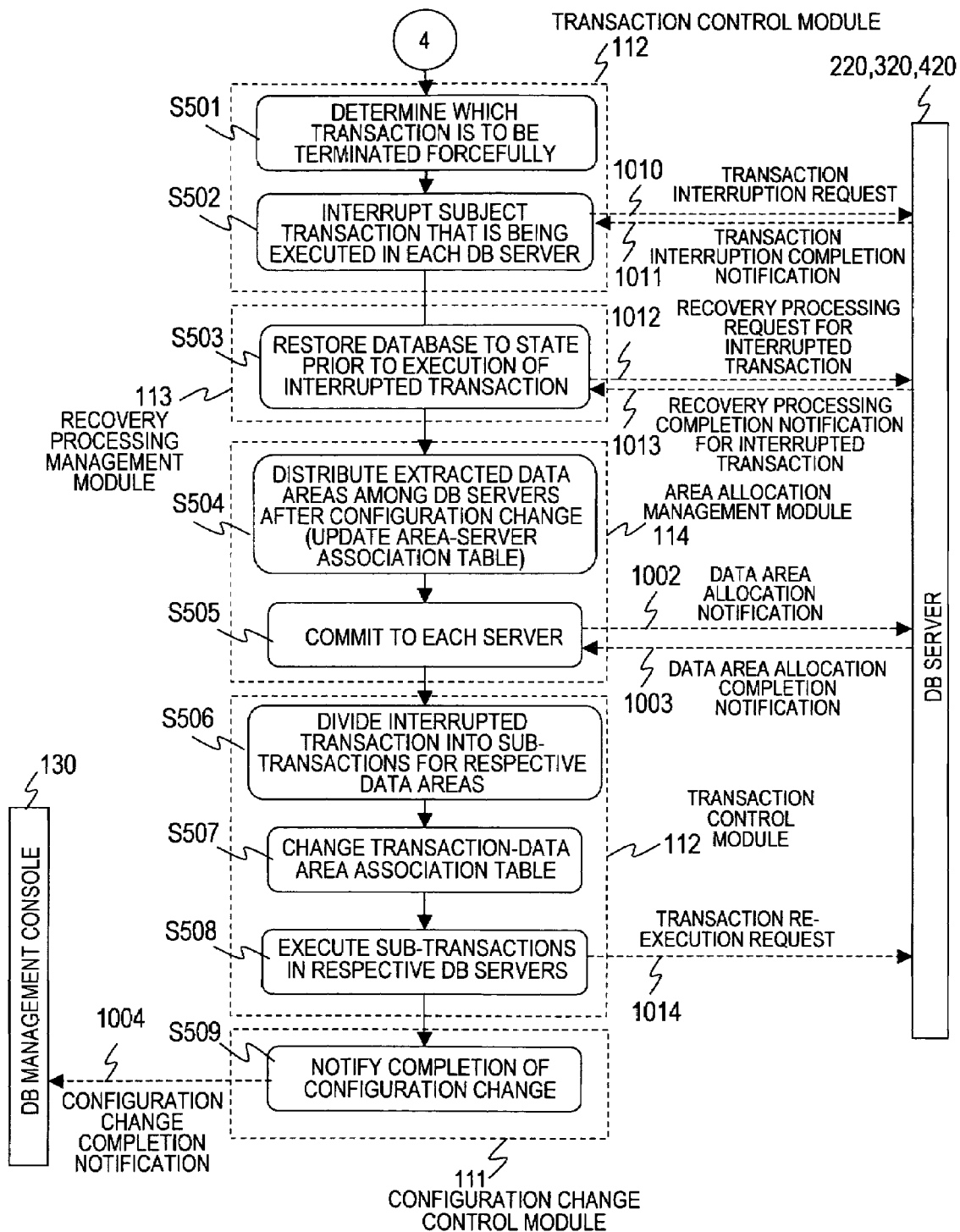
FIG. 16 is a flow chart showing the procedure of changing the configuration by interrupting a transaction that is being executed according to the third embodiment.

FIG. 16 is a flow chart showing the procedure of relocating data areas after interrupting a transaction according to the third embodiment.

The transaction control module 112 first determines which transaction is to be interrupted (S501). A transaction to be interrupted is chosen by referring to the transaction-area association table 116 to extract transactions that are associated with the data areas obtained in the processing of S401 and by narrowing the extracted transactions down according to the transaction selection method 917 of the configuration change instruction 1001.

The transaction selection method 917 specified in the third embodiment is "less elapsed time" as mentioned above. The transaction control module 112 refers to the transaction-area association table 116 of FIG. 10 and chooses the "transaction 05" which has the shortest elapsed time 923.

Next, in processing of S502, the transaction control module 112 sends a transaction interruption instruction 1010 to the DB server that is executing the transaction to be interrupted. The transaction control module 112 refers to the transaction-area association table 116 to obtain a relevant data area and extracts the DB server from the area-server association table 115 using the identifier of the obtained data area. The transaction-area association table 116 of FIG. 10 shows that subject data areas when the "transaction 05" is a transaction to be interrupted are the areas #A and #D. The area-server association table 115 shows that the areas #A and #D are used exclusively by the DB server (1) and the DB server (2), respectively. The DB management server 110 accordingly instructs the DB server (1) and the DB server (2) to interrupt the transaction.

Figure 17:
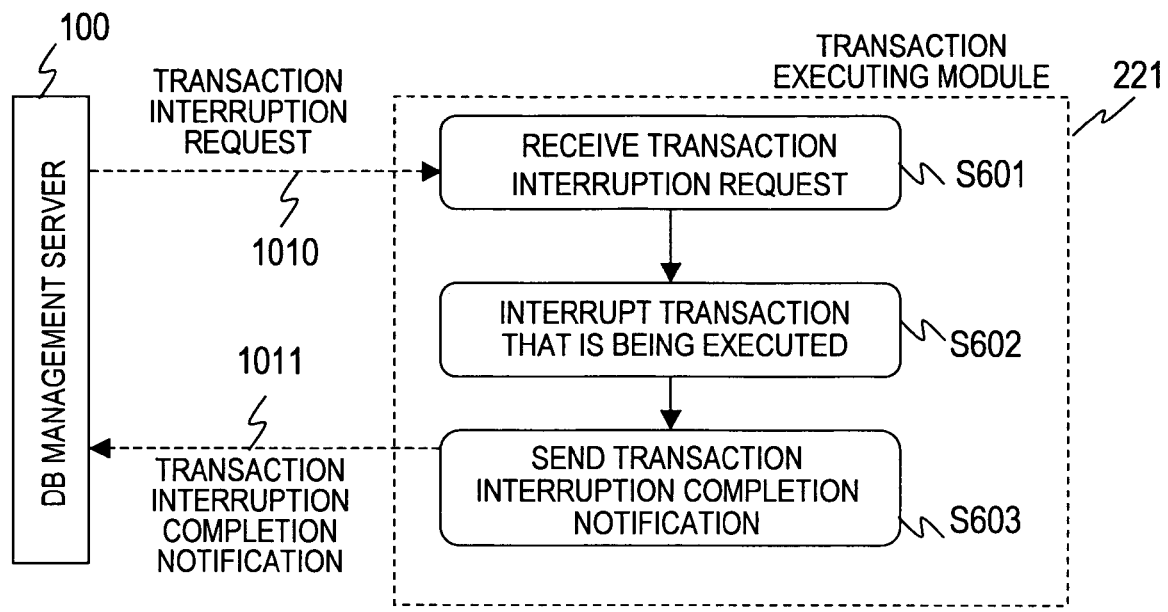
FIG. 17 is a flow chart showing the procedure of interrupting a transaction that is being executed according to the third embodiment.

The procedure of interrupting a transaction that is being executed will be described. FIG. 17 is a flow chart showing how a DB server interrupts transaction that is being executed upon instruction from the DB management server 110. The description takes the DB server 220 as an example.

The transaction executing module 221 of the DB server 220 first receives the transaction interruption request 1010 from the DB management server 110 (S601).

The transaction executing module 221 interrupts the execution of the specified transaction (S602).

After the interruption of the transaction is completed, the transaction executing module 221 sends an interruption completion notification 1011 to the DB management server 110 (S603).

The description returns to the flow chart of FIG. 16.

The transaction control module 112 receives the interruption completion notification 1011 from each DB server and executes processing of S503.

As the transaction interruption is completed, the recovery processing management module 113 restores the data areas to a state prior to the execution of the transaction (S503). The recovery processing management module 113 instructs the DB server that has been executing the interrupted transaction to execute roll back (1012).

Figure 18:
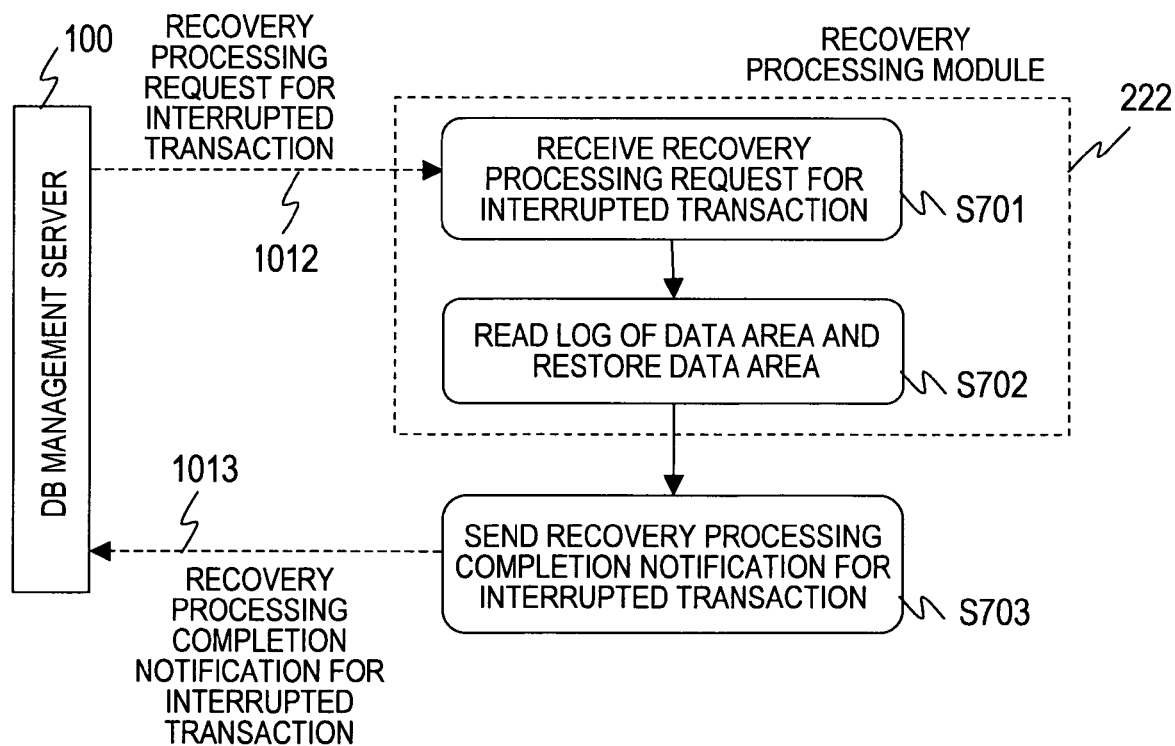
FIG. 18 is a flow chart showing the procedure of recovering data whose consistency is not ensured because of an interrupted transaction according to the third embodiment.

The procedure of recovering the consistency of an interrupted transaction will be described. FIG. 18 is a flow chart showing processing of correcting inconsistency that is caused by forcefully terminating a transaction. The description takes the DB server 220 as an example.

The recovery processing module 222 of the DB server 220 first receives a recovery processing request 1012 to recover the interrupted transaction from the DB management server 110 (S701).

The recovery processing module 222 reads the log of the interrupted transaction out of the log area 800, and restores the data areas (S702).

As the data area restoration is completed, the recovery processing module 222 sends a recovery processing completion notification 1013 to the DB management server 110 (S703).

The description returns to the flow chart of FIG. 16.

The recovery processing management module 113 receives the recovery processing completion notification 1013 after roll back is completed in each DB server, and executes processing of S504.

Then, the area allocation management module 114 relocate the data areas (S505, S505). The processing of S504 and S505 is the same as the processing of S105 and S106 of FIG. 7. The area management module 223 changes which DB server uses exclusively which of the data areas extracted in the processing of S401 of FIG. 15.

Once the data areas finish being relocated, the configuration has been changed and the data areas extracted in the processing of S401 have been allocated to new DB servers. Furthermore, the data consistency has been ensured by rolling back the transaction that has been extracted in the processing of S501 to be interrupted in the middle of the execution.

The transaction control module 112 then re-executes the interrupted transaction (S506 to S508). The processing of S506 to S508 are the same as the processing of S302 to S304 of FIG. 9.

The transaction control module 112 first divides the interrupted transaction into sub-transactions that are executed in data areas after the configuration change (S506). The transaction control module 112 next updates the transaction-area association table 116 (S507). Thereafter, the transaction control module 112 sends a sub-transaction re-execution request 1014 to the DB servers (S508).

The transaction control module 112 thus re-executes, after the configuration change, a transaction that has been interrupted through the processing of S501 and S502. This enables the DB management server 110 to ensure that the interrupted transaction is executed after the configuration change.

As the interrupted transaction is re-executed and the configuration change is completed, the configuration change control module 111 sends the configuration change completion notification 1004 to the DB management console 130 (S509).

According to the third embodiment, the configuration is changed after interrupting a transaction that is being executed. The interrupted transaction is rolled back to restore the database to a state prior to the execution of the transaction, and the transaction is executed again after the configuration is changed. This ensures the data consistency and makes it possible to quickly finish a configuration change even when a transaction is being executed in every data area and, in addition, it takes long to finish the transactions being executed.

The third embodiment describes a case of adding a DB server, but is also applicable to a removal of a DB server as in the first and second embodiments.

This invention can be applied to a shared-nothing database management system. This invention is particularly favorably applied to a system that is required to operate continuously.

While the present invention has been described in detail and pictorially in the accompanying drawings, the present invention is not limited to such detail but covers various obvious modifications and equivalent arrangements, which fall within the purview of the appended claims.

What is claimed is:

1. A method of changing a configuration of a shared-nothing database system having a plurality of database servers that perform data processing, a storage system that provides data areas to the database servers such that each of the data areas is allocated to a respective database server of the plurality of database servers and thereby dedicatedly accessible from the respective database server to which the data area is allocated, and a management server that is connected to the database servers via a network and includes a database management system that divides a transaction into a plurality of sub-transactions and allocates the sub-transactions to the database servers for execution of the transaction, maintaining, by the management server, transaction-area association information indicative of correspondence relations between each of the database servers and each data area allocated to the database server, and correspondence relations between each transaction that is presently executing and each of the data areas that is accessed by the transaction that is presently executing;

extracting, by the management server, data areas of the data areas provided to the database servers that can be subjects of a configuration change of the database servers;

selecting, by the management server, a data area for reallocation in the configuration change of the database servers from the extracted data areas that are not accessed by any transaction that is presently executing based on the transaction-area association information; and reallocating, by the management server, the selected data area without interrupting any transaction that is presently executing.

2. The configuration changing method according to claim 1, further comprising:

creating, by the management server, an input screen to prompt an input of configuration change conditions, the input screen including a field for specifying whether to add or remove a database server, a field for entering an identifier of the database server to be added or removed, and a field for specifying whether to shut down the database management system, and changing, by the management server, configurations of the database servers according to the input of the configuration change conditions.

3. The configuration changing method according to claim 1, further comprising:

selecting, by the management server, a data area from the extracted data areas that are accessed by a transaction that is presently executing as a suboptimal candidate data area for reallocation;

waiting, by the management server, until the transaction accessing the suboptimal candidate data area is completed; and reallocating, by the management server, the suboptimal candidate data area upon completion of the transaction accessing the suboptimal candidate data area.

4. The configuration changing method according to claim 3, further comprising the steps of:

creating, by the management server an input screen to prompt an input of configuration change conditions, the input screen including a field for specifying whether to add or remove a database server, a field for entering an identifier of the database server to be added or removed, a field for specifying whether to shut down the database management system, a field for specifying a data area to be reallocated, and a field for specifying a method of allocating the data area to be reallocated; and changing, by the management server, configurations of the database servers according to the input of the configuration change conditions.

5. The configuration changing method according to claim 1, further comprising:

selecting, by the management server, a data area from the extracted data areas that are accessed by a transaction that is presently executing as a suboptimal candidate data area for reallocation;

interrupting, by the management server, the transaction that accesses the suboptimal candidate data area;

restoring, by the management server, each of the data areas accessed by the transaction that accesses the suboptimal candidate data according to the transaction-area association information to a state of the data area before the interrupted transaction being executed, prior to reallocating the data area specified for reallocation; and re-executing, by the management server, the interrupted transaction after reallocating the selected data area.

6. The configuration changing method according to claim 5, further comprising the steps of:

creating, by the management server, an input screen to prompt an input of configuration change conditions, the input screen including a field for specifying whether to add or remove a database server, a field for entering an identifier of the database server to be added or removed, a field for specifying whether to shut down the database management system, a field for specifying a data area to be reallocated, a field for specifying a method of allocating the data area to be reallocated, a field for specifying whether to interrupt a transaction, and, when interrupting a transaction is chosen, a field for specifying a standard of selecting which transaction is to be interrupted; and changing, by the management server, configurations of the database servers according to the input of the configuration change conditions.

7. A management server implemented in a shared-nothing database system having a plurality of database servers that perform data processing and are connected to the management server via a network, and a storage system that provides data areas to the database servers such that each of the data areas is allocated to a respective database server of the plurality of database servers and thereby dedicatedly accessible from the respective database server to which the data area is allocated, the management server comprising:

a database management system that divides a transaction into a plurality of sub-transactions and allocates the sub-transactions to the database servers for execution of the transaction;

a data store maintaining transaction-area association information indicative of correspondence relations between each of the database servers and each data area allocated to the database server, and correspondence relations between each transaction that is presently executing and each of the data areas that is accessed by the transaction that is presently executing; and a configuration change control module changing a configuration of the database management system, the configuration change control module extracting data areas of the data areas provided to the database servers that can be subjects of a configuration change of the database servers, selecting a data area for reallocation in the configuration change of the database servers from the extracted data areas that are not accessed by any transaction that is presently executing based on the transaction-area association information, the configuration change module further reallocating the selected data area without interrupting any transaction that is presently executing.

8. The management server according to claim 7, further comprising an input module creating an input screen to prompt an input of configuration change conditions, the input screen including a field for specifying whether to add or remove a database server, a field for entering an identifier of the database server to be added or removed, and a field for specifying whether to shut down the database, and wherein the configuration change control module changes configurations of the database servers according to the input of the configuration change conditions.

9. The management server according to claim 7, further comprising an input module creating an input screen to prompt an input of configuration change conditions, the input screen including a field for specifying whether to add or remove a database server, a field for entering an identifier of the database server to be added or removed, a field for specifying whether to shut down the database management system, a field for specifying a data area to be reallocated, and a field for specifying a method of allocating the data area to be reallocated, and wherein the configuration change control module, based on the input of the configuration change conditions, further selects, from the extracted data areas, a data area from the extracted data areas that are accessed by a transaction that is presently executing as a suboptimal candidate data area for reallocation, waits until the transaction that is presently executing is completed, and reallocates the candidate data area upon completion of the transaction that is presently executing.

10. The management server according to claim 7, further comprising an input module creating an input screen to prompt an input of configuration change conditions, the input screen including a field for specifying whether to add or remove a database server, a field for entering an identifier of the database server to be added or removed, a field for specifying whether to shut down the database management system, a field for specifying a data area to be reallocated, a field for specifying a method of allocating the data area to be reallocated, a field for specifying whether to interrupt a transaction, and, upon interruption of a transaction being specified, a field for specifying a standard of selecting which transaction is to be interrupted,
wherein the configuration change control module, based on the input of the configuration change conditions, further selects, from the extracted data areas, a data area from the extracted data areas that are accessed by a transaction that is presently executing as a suboptimal candidate data area for reallocation, interrupts the transaction that accesses the suboptimal candidate data area according to the transaction-area association information, restores each of the data areas accessed by the transaction that accesses the suboptimal candidate data according to the transaction-area association information to a state of the data area before the interrupted transaction being executed, reallocates the suboptimal candidate, and re-executes the interrupted transaction after reallocating the suboptimal candidate data area.

11. A shared-nothing database system, comprising:
a plurality of database servers that perform data processing;
a storage system that provides data areas to the database servers such that each of the data areas is allocated to a respective database server of the plurality of database servers and thereby dedicatedly accessible from the respective database server to which the data area is allocated; and
a management server that is connected to the database servers via a network and includes:
a database management system that divides a transaction into a plurality of sub-transactions to be allocated to the database servers for execution of the transaction;
a data store maintaining transaction-area association information indicative of correspondence relations between each of the database servers and each data area allocated to the database server, and correspondence relations between each transaction that is presently executing and each of the data areas that is accessed by the transaction that is presently executing; and
a configuration change control module changing a configuration of the database management system, the configuration change control module extracting data areas of the data areas provided to the database servers that can be subjects of a configuration change of the database servers, selecting a data area for reallocation in the configuration change of the database servers from the extracted data areas that are not accessed by any transaction that is presently executing based on the transaction-area association information, the configuration change module further reallocating the selected data area without interrupting any transaction that is presently executing.

12. The shared-nothing database system according to claim 11,
wherein the management server creates an input screen to prompt an input of configuration change conditions, the -input screen including a field for specifying whether to add or remove a database server, a field for entering an identifier of the database server to be added or removed, and a field for specifying whether to shut down the database management system, and
wherein the configuration change control module changes configurations of the database servers according to the input of the configuration change conditions.

13. The shared-nothing database system according to claim 11, wherein the configuration change control module, based on the input of the configuration change conditions, further selects, from the extracted data areas, a data area from the extracted data areas that are accessed by a transaction that is presently executing as a suboptimal candidate data area for reallocation, waits until the transaction that is presently executing is completed, and reallocates the candidate data area upon completion of the transaction that is presently executing.

14. The shared-nothing database system according to claim 13,
wherein the management server creates an input screen to prompt an input of configuration change conditions, the input screen including a field for specifying whether to add or remove a database server, a field for entering an identifier of the database server to be added or removed, a field for specifying whether to shut down the database management system, a field for specifying a data area to be reallocated, and a field for specifying a method of allocating the data area to be reallocated, and
wherein the configuration change control module changes configurations of the database servers according to the input of the configuration change conditions.

15. The shared-nothing database system according to claim 11, wherein the transaction-area association information further includes a respective elapsed time for each of the transactions being executed, and
wherein the configuration change control module further selects, from the extracted data areas, a data area from the extracted data areas that are accessed by a transaction that is presently executing as a suboptimal candidate data area for reallocation, interrupts the transaction that accesses the suboptimal candidate data area according to the transaction-area association information, restores each of the data areas accessed by the transaction that accesses the suboptimal candidate data according to the transaction-area association information to a state of the data area before the interrupted transaction being executed, reallocates the suboptimal candidate, and re-executes the interrupted transaction after reallocating the suboptimal candidate data area.

16. The shared-nothing database system according to claim 15,
wherein the management server creates an input screen to prompt an input of configuration change conditions, the input screen including a field for specifying whether to add or remove a database server, a field for entering an identifier of the database server to be added or removed, a field for specifying whether to shut down the database management system, a field for specifying a data area to be reallocated, a field for specifying a method of allocating the data area to be reallocated, a field for specifying whether to interrupt a transaction, and, when interrupting a transaction is chosen, a field for specifying a standard of selecting which transaction is to be interrupted, and wherein the configuration change control module changes configurations of the database servers according to the input of the configuration change conditions.

17. The configuration changing method according to claim 5, wherein specifying the data area for reallocation in the configuration change comprises:

selecting a transaction from the transactions being executed that has the lowest respective elapsed time among the transactions being executed as a transaction available for interruption according to the transaction-area association information; and determining the data area for reallocation from among the data areas having an association with the transaction available for interruption according to the transaction-area association information.

* * * * *